US010156957B2

(12) United States Patent
Dyar et al.

(10) Patent No.: US 10,156,957 B2
(45) Date of Patent: Dec. 18, 2018

(54) SEMI-MODAL INTERACTION BLOCKER

(71) Applicant: Oracle International Corporation, Redwood Shores, CA (US)

(72) Inventors: Samuel Stephen Dyar, Miami, FL (US); Bo Jonas Birger Lagerblad, Palo Alto, CA (US); Lawrence Hand, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 572 days.

(21) Appl. No.: 14/866,365

(22) Filed: Sep. 25, 2015

(65) Prior Publication Data

US 2016/0092038 A1   Mar. 31, 2016

Related U.S. Application Data

(60) Provisional application No. 62/079,363, filed on Nov. 13, 2014, provisional application No. 62/056,406, filed on Sep. 26, 2014.

(51) Int. Cl.
*G06F 3/0481* (2013.01)
*G06F 3/0484* (2013.01)

(52) U.S. Cl.
CPC ........ *G06F 3/0481* (2013.01); *G06F 3/04842* (2013.01)

(58) Field of Classification Search
CPC ..................................................... G06F 3/0481
See application file for complete search history.

(56) References Cited

U.S. PATENT DOCUMENTS

2005/0144269 A1\* 6/2005 Banatwala .............. G06F 9/542
709/223

\* cited by examiner

*Primary Examiner* — Pei Yong Weng
(74) *Attorney, Agent, or Firm* — Kilpatrick Townsend & Stockton LLP

(57) ABSTRACT

Embodiments can provide interactivity to one or more components (e.g., windows, dialog boxes, tool bar, etc.) in a visual analyzer application while blocking interactivity for other components displayed on a GUI of the application. A contribution mechanism can be leveraged where a broadcast message can be sent to various components displayed on the GUI of the application. The various components within the application can then indicate whether they would like to be kept interactive during a triggering event (e.g., upon selection of a certain component). Upon receiving the indication that the components would like to remain interactive, the application allows those components to remain interactive while preventing access to other components in the GUI.

20 Claims, 11 Drawing Sheets

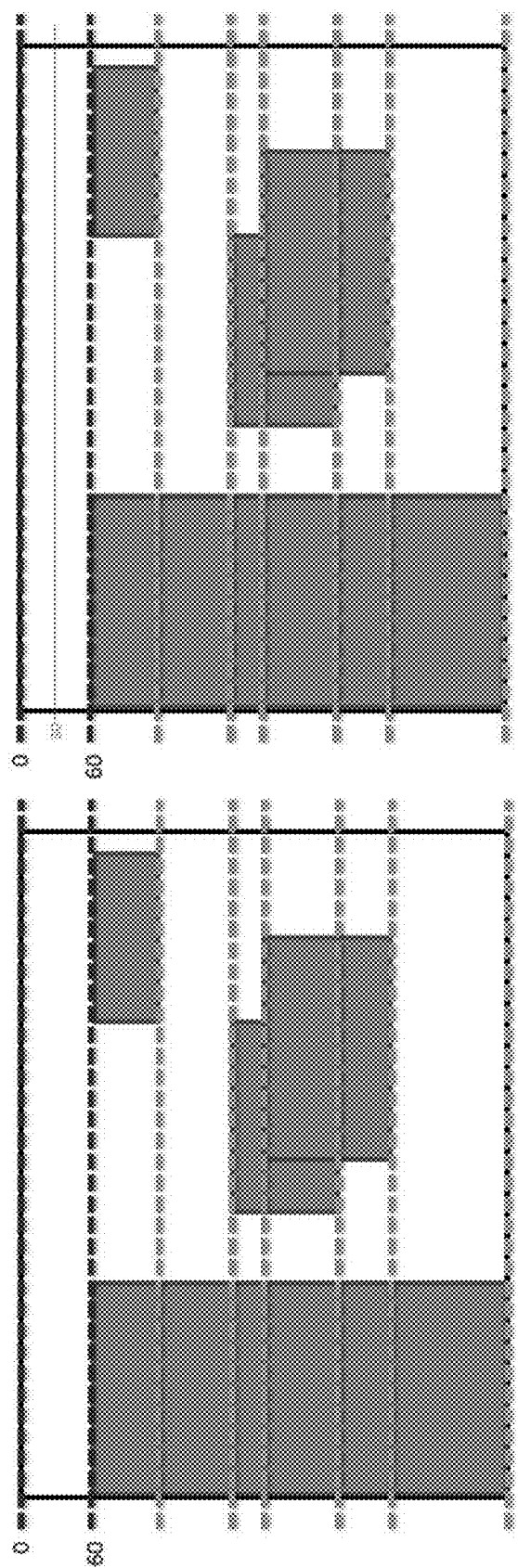

US 10,156,957 B2

SEMI-MODAL INTERACTION BLOCKER

CROSS-REFERENCES TO RELATED APPLICATIONS

This application is a non-provisional application and claims the benefit and priority of U.S. Provisional Application No. 62/056,406, filed on Sep. 26, 2014, titled "SEMI-MODAL INTERACTION BLOCKER," and U.S. Provisional Application No. 62/079,363, filed on Nov. 13, 2014, titled "VISUAL ANALYZER SYSTEM," both of which are herein incorporated by reference in their entirety for all purposes.

BACKGROUND

A visual analyzer application that enables a user to create and interact with various components displayed on a graphical user interface (GUI) of the application can present significant challenges as the application needs to figure out which components to keep interactive while the user is interacting with certain components. As there are many components being added and displayed on the GUI, it would be difficult to keep track of the interactivity dependencies among the different components. There is a need to be able to determine dynamically how to maintain the interactivity of certain components while blocking the interactivity of others as the user is interacting with components that are dependencies of those certain components.

SUMMARY

Some embodiments provide a semi-modal pane component that allows interactions with one or more components being displayed on a graphical user interface (GUI) of a visual analyzer application while preventing interaction with other components on the GUI. In some embodiments, a contribution mechanism can be leveraged where a broadcast message can be sent to all components or processes corresponding to the components in the application. The various components within the application can signal whether to be kept interactive while a user is interacting with certain areas of a GUI of the application. Upon receiving the indication that the components or subcomponents are to be kept interactive, the application permits interactivity with those components or subcomponents. This provides the ability to create transient dialogs that remain open when a user interacts with certain areas of the GUI and close once the user begins to interact with another area of the GUI.

Some embodiments provide techniques (e.g., a method, a system, non-transitory computer-readable medium storing code or instructions executable by one or more processors) for blocking interactivity with a subset of components of a visual analyzer application. One such technique can include detecting, by one or more processors, an event with respect to a component in a set of components displayed on a graphical user interface (GUI); in response to detecting the event, broadcasting the event and contextual information associated with the event to one or more processes corresponding to the other components in the set of components; receiving response information indicating to keep a subset of the components non-blocked, wherein the subset of the components are kept interactive when the subset of the components are non-blocked; and re-rendering the GUI based on the response information such that the subset of the components to be kept interactive are kept interactive while interactivity with the remaining subset of the components is blocked.

In some embodiments, the event can include identifying information associated with the component. In certain embodiments, detecting the event includes receiving a selection of the component in the set of components displayed on the GUI, the selection of the component causing another component to be displayed on the GUI, wherein the event and contextual information associated with the event is also broadcasted to the other component caused to be displayed by the selection of the component. In some embodiments, the response information is received from each of the one or more processes corresponding to the other components in the set of components, the response information including an array corresponding to each component, wherein the response information indicates whether to keep each of the components or a portion of the component less than the full component interactive during the event.

In certain embodiments, re-rendering the GUI includes enabling access to the subset of components during the event and blocking interactivity with the remaining subset of components. In some embodiments, blocking interactivity with the remaining subset of the components includes generating a set of overlays to be displayed over the remaining subset of components, and wherein the set of overlays are generated by determining a set of coordinates of the subset of the components and building a collection of blocks around the coordinates of the subset of the components. In certain embodiments, blocking interactivity with the remaining subset of the components includes: determining one or more regions within a browser window that is occupied by the subset of components; identifying, using the determined one or more regions, one or more areas within the browser window that is not occupied by the subset of components; generating one or more panels to cover the identified one or more areas within the browser window that is not occupied by the subset of components; and inserting the one or more panels in the identified one or more areas within the browser window to block interactivity with the non-interactive components below.

BRIEF DESCRIPTION OF THE DRAWINGS

FIGS. 4A-4H illustrate an example of blocking interactivity with one or more components or subcomponents in a GUI of a visual analyzer application in accordance with some embodiments.

DETAILED DESCRIPTION

Figure 1:
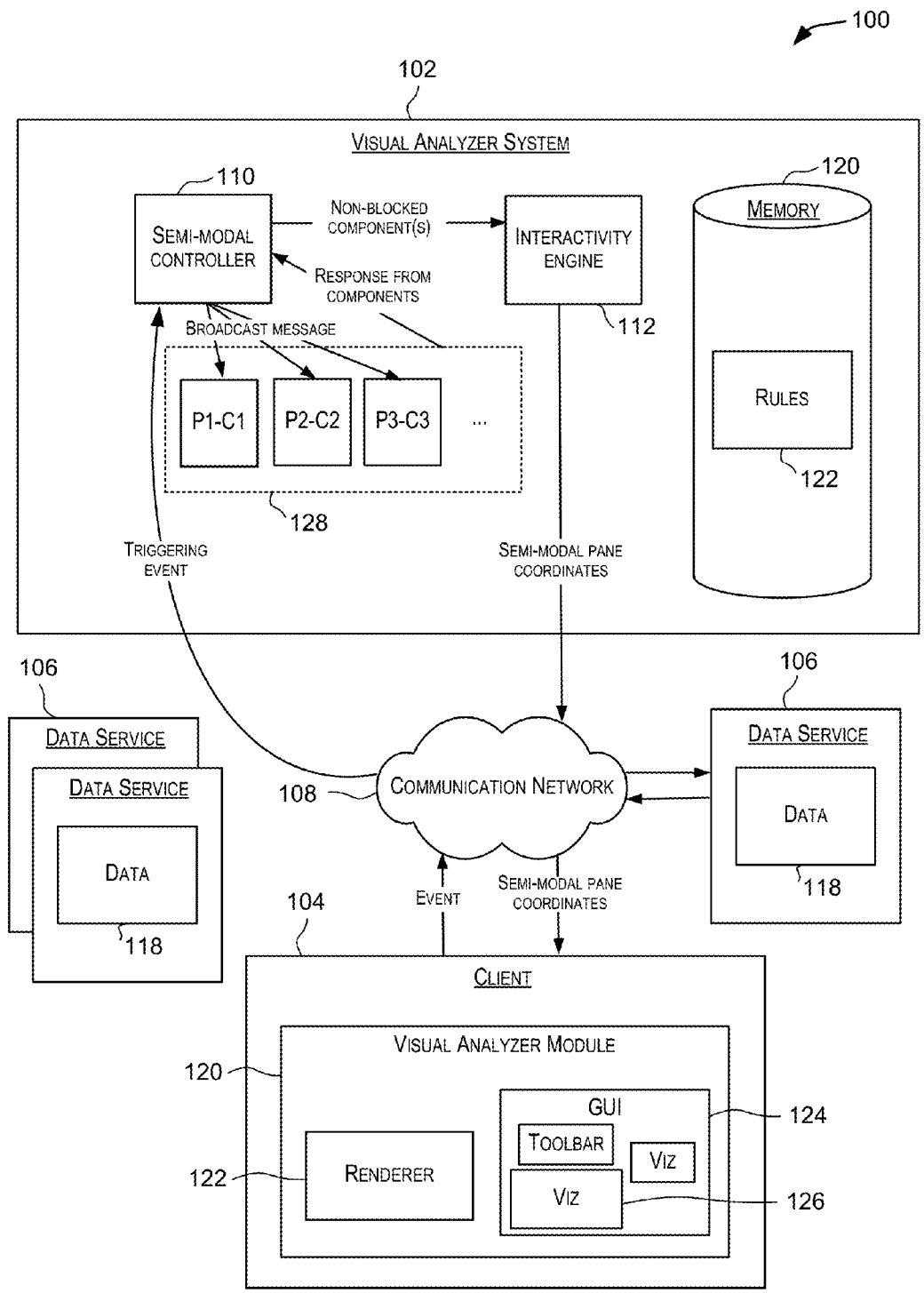
FIG. 1 illustrates an example block diagram of a computing environment in accordance with certain embodiments of the present invention.

Some embodiments can provide interactivity to one or more select elements (e.g., windows, dialog boxes, etc.) in a visual analyzer application while blocking interactivity for other elements in the application. In some embodiments, a contribution mechanism can be leveraged where a broadcast message can be sent to all components or processes corresponding to the components in the application. The various components within the application can signal whether to be kept interactive while a user is interacting with certain areas of a GUI of the application. Upon receiving the indication that the components or subcomponents are to be kept interactive, the application permits interactivity with those components or subcomponents. Some embodiments can permit interactivity with the components or subcomponents by blocking the remainder of the components, by rendering the remainder of the components transparent, etc.

Conventional applications may provide several visible objects where only one visible object is enabled for interactivity or where all visible objects are enabled for interactivity. For purposes of this disclosure, components are referred to as being active or enabled for interactivity or being inactive or disabled for interactivity. For instance, some applications may provide a pop-up dialog such as a properties dialog box upon the selection of a component or subcomponent where a user may be allowed to interact only with the properties dialog box and nothing outside of the properties dialog box. Embodiments of the present invention can block interactivity for some components or subcomponents of a visual analyzer application while ensuring that interactivity for other components or subcomponents is maintained. In one example, interactivity with one or more graphic visualizations and panes (e.g., control pane, toolbox) within the application may be maintained in addition to the pop-up dialogue box. The components and/or subcomponents to keep interactive may be determined dynamically based on a user's present interaction with one or more components being displayed in the GUI.

In some embodiments, a visual analyzer system can present one or more visualizations to a user via a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension. For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

Building a user interface based on a contribution mechanism enables the plug-in architecture to add new types of components that can hook themselves into existing paradigms in the GUI. The contribution mechanism does not preclude a developer from developing a new component that the one or more components in the GUI is unaware of.

Further, in some embodiments, the component that is the source component causing the broadcasting of an event associated with the component need not be aware of the various components presented in the GUI to be able to perform a dynamic determination as to which components and subcomponent need to remain interactive. The source component also need not be aware of the various subcomponents to be included in the interactivity-enabled subset of components.

I. Example Computing Environment

FIG. 1 illustrates an example block diagram of a computing environment 100 in accordance with certain embodiments of the present invention. As shown, computing environment 100 includes visual analyzer system 102 communicatively coupled to client device 104 and data service 106 via a communication network 108. The embodiment depicted in FIG. 1 is merely an example and is not intended to unduly limit the claimed embodiments of the present invention. One of ordinary skill in the art would recognize many variations, alternatives, and modifications. For example, visual analyzer system 102 can be part of client device 104 or can be running on one or more servers.

Client device 104 may be of various different types, including, but not limited to a personal computer, a desktop, a mobile or handheld device such as a laptop, a mobile phone, a tablet, etc., and other types of devices. The term "server" as used herein typically refers to an application that executes and operates as a server according to a client-server protocol. Some examples of servers include database servers, web servers, application servers, file servers, mail servers, print servers, gaming servers, etc. In some contexts, though, the term "server" may also refer to computing hardware that can or does execute a server application. However, the particular meaning of a use of the term "server" will be apparent to those of skill in the art based upon its context of use.

Communication network 108 facilitates communications between one or more client devices such as client device 104 and visual analyzer system 102. Communication network 108 can be of various types and can include one or more communication networks. For example, communication network 108 can include, without restriction, the Internet, a wide area network (WAN,), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 108 may include any communication network or infrastructure that facilitates communications between one or more client devices such as client device 104 and visual analyzer system 102.

Client device 104 can display one or more visualizations (also referred to as graphics or charts) through a web browser or a user interface of a visual analyzer application in some embodiments. A visualization can be generated based on dimensions of data (also referred to as columns in a database or business objects) identified by a user of client device 104. In some embodiments, a user of client device 104 can select one or more dimensions of data 118 available from various data services 106. Upon receiving the user's selection of the one or more dimensions of data 118, a visual analyzer module 120 can obtain the requested data from data service 106 via communication network 108 and generate a visualization 126. Visual analyzer module 120 can be an application program or a piece of code that is executable on individual computing devices. Renderer 122 can then render one or more visualizations 126 on GUI 124 of client device 104. GUI 124 can present multiple visualizations 126 and or other objects and tools to the user.

In some embodiments, visual analyzer module 120 on client device 104 can be a standalone executable application, a portion of an application (e.g., a browser application or a local application), a configuration file to be used with an application, etc. The web browser or the visual analyzer application user interface can provide a projection of one or more databases. The user can identify one or more dimensions of data available in the one or more databases and request the visual analyzer application to generate a visualization that represents the one or more dimensions of data retrieved from the databases. As described, an example of a database is a relational database with columns and rows. A dimension of data can correspond to a column in a database while records can correspond to the rows in the database.

As described, a visual analyzer application can display one or more visualizations on GUI 124 of client device 104. The visualizations may be generated by visual analyzer module 120, rendered by renderer 122, and displayed on device 104 through a web browser or a user interface of the visual analyzer application in some embodiments. The web browser or the visual analyzer application user interface can provide a projection of one or more databases using one or more representations (e.g., tabs, text, menus, business objects, folders). The user can select one or more dimensions of data (also referred to as columns in a database, or business objects) available in the one or more databases to be presented by a visualization. The application may then generate and display a visualization based on the one or more dimensions of data that the user would like represented through the visualization.

After one or more visual components (including visualizations, control panels, display panes, dialog boxes, etc.) have been generated and presented on client device 104, the user can interact with one or more of those visual components. In one example, the user can interact with a visual component by selecting the component, by selecting a subcomponent within the component (e.g., a command to open a dialogue box, a selection of a portion of a visualization), etc. In another example, the user can interact with a visual component such as a visualization by changing the visualization type, editing the title of a visualization, right clicking on the visualization to open the properties dialogue, add a column to the edges of the visualization, etc. Upon receiving a triggering event (e.g., selection of a particular visual component, editing the visualization, adding a column to the visualization, causing a properties dialogue to be displayed, etc.), visual analyzer module 120 on client device 104 can convey the triggering event to visual analyzer system 102. As previously described, visual analyzer system 102 can be running on client device 104 in some embodiments.

Visual analyzer system 102 includes multiple components such as, but not limited to, semi-modal controller 110, interactivity engine 112, and memory 120 that stores a set of rules 122. Semi-modal controller 110 can determine whether components within the visual analyzer application would like to remain interactive with the user. Upon receiving a signal of a selection of a particular active component (e.g., a particular visualization, a particular display pane, a particular dialog box) or other types of interaction with visual components on the GUI via GUI 124, semi-modal controller 110 can identify the component that is the source of the signal. In some embodiments, information pertaining to the selected component can be packaged into a payload and sent to semi-modal controller 110.

Semi-modal controller 110 can receive information relating to the selected component from visual analyzer module 120 and send a broadcast message to various other components in the application. In some embodiments, the broadcast message can be sent to one or more processes corresponding to all the various other components in the application aside from the originating component identified by the event. There may be different processes running in memory (e.g., random access memory (RAM)) corresponding to the different components 128, such as process 1 for C1, process 2 for C2, process 3 for C3, etc. Instead of processes corresponding to each component, there may be threads corresponding to each component in some embodiments to which the broadcast messages are being sent. While processes corresponding to different components are shown in this example, this figure may instead show semi-modal controller 110 sending broadcast messages to each individual component aside from the component with which the user has interacted.

As described, in some embodiments, upon receiving the signal associated with the event, semi-modal controller 110 can broadcast the signal to the processes or the threads corresponding to the different components 128. In certain embodiments, the broadcast message can be sent to all components in the application excluding the originating component. Some embodiments may not send the broadcast message to all the other components aside from the originating component but may send the message to a subset of the components fewer than all of the components. There may be components that the application keeps interactive regardless of the type of event. In such instances, there would not be a need to send the broadcast message to those components. For instance, the visual analyzer application may designate to keep interactive a data elements pane that allows a user to add data elements corresponding to columns to the canvas or a visualization at all times while the visual analyzer application is active.

In certain embodiments, the broadcast message may include identifying information for the originating or source component associated with the event and other contextual information associated with the event. Contextual information associated with the event provides information about the event, including the user interaction with the originating component that triggered the event. Examples of contextual information of the event can include opening a dialogue box or double-clicking certain subcomponents in a visualization (e.g., data in the visualization such as a bar, a line segment, a point in a scatterplot, etc.). In some embodiments, components can include a tool bar, a visualization, a control pane, and other types of visual components displayable on a GUI. The subcomponents can be selectable elements within a component that is less than the entire component, such as a button inside a tool bar, axes of or data presented by a visualization, a drop down menu or a selectable item within a control pane, etc.

After the broadcast message is sent to the various components in the application, the components that receive this message can make a determination as to whether it would like to be remain interactive for this type of event. Semi-modal controller 110 can receive response information from these various components indicating whether they would like to be active or remain interactive during the event. A response from a component can indicate that the component or subcomponents within the component would like to remain interactive during the event (e.g., while the originating component is displayed and interactive). In some embodiments, a response can indicate that a component does not want to be interactive.

In one example, an event can include an interaction with one or more components or subcomponents of a visual analyzer application, such as an interaction with a scatterplot visualization. The interaction with the scatterplot visualization may cause a transient dialogue such as a property dialogue to be displayed on the GUI. In some embodiments, the property dialogue may also be one of the components that receives a broadcast message as to whether to remain interactive while the user is interacting with the scatterplot. In this instance, the property dialogue may send a response to semi-modal controller 110 indicating that it would like to remain interactive while the user interacts with the scatterplot visualization. This provides the ability to create transient dialogues that remain open when the user interacts with appropriate areas of the GUI and closes once the user begins to interact with another area of the GUI. When the user begins to interact with other components displayed in the GUI, another broadcast message can be sent out to the various components in the application to determine which components and subcomponents would like to remain interactive for the new event.

In certain embodiments, the interactivity of a component or subcomponent can be maintained by not blocking access or interactivity with those components on the GUI. For example, interactivity of one or more components can be maintained by creating a semi-modal blocking pane over the remainder of the components in the GUI that blocks or prevents user access to the remainder of the components. Once user access is blocked, the user may not select or interact with those components (or subcomponents). In this instance, the components may still be active in the sense that the components have not been deactivated but are now prevented from being accessed. In certain embodiments, interactivity with certain components may be blocked or prevented by deactivating those components.

In some embodiments, the response information received from each component (or process(es) associated with each component) can include an array that identifies whether to have the entire component be interactive or to have subcomponents fewer than the entire component be interactive. In certain embodiments, the array can include binary code to indicate whether to make a whole component blocked or non-blocked or whether to make a portion of the component (e.g., subcomponents) blocked or non-blocked.

In certain embodiments, each of the components (e.g., a property dialog) within the application can have associated rules or specifications 122 on whether it would like to remain interactive while certain components are active or being interacted with. In one example, a property dialog may have associated properties or rules that indicate that it should be enabled when a specific instance of a scatterplot is enabled. As such, by inspecting a particular payload identifying the specific instance of the scatterplot (e.g., via a given ID), the property dialog component may send a response message indicating its desire to remain active while the scatterplot element is being interacted with by the user.

In some embodiments, the various components may inspect the payload that includes the action that triggered this broadcasting event in addition to an identification of the originating component. The various components receiving and inspecting the payload may determine that it would like to be active for a particular reason or action that triggered this broadcast. For instance, when a property dialog determines that the action that triggered this broadcast is a user selection to show a property dialog on a scatterplot visualization, then the property dialog may determine that it would like to be interactive or unblocked. Different components may be associated with different rules specifying whether a component should be enabled for one or more other components, actions, or a combination thereof. For instance, a component may be specified to be interactive or unblocked for only a particular instance of a scatterplot while another component may be specified to be interactive for all scatterplots. Another component may be specified to be interactive for a scatterplot instance and upon receiving an action such as a show property dialog action directed to the scatterplot instance.

After receiving responses from other components on whether they would like to be interactive while the originating component is active, semi-modal controller 110 can send those responses to interactivity engine 112. Upon determining the components (also referred to as GUI objects) that would like to remain interactive, interactivity engine 112 may cause those components to be interactive while causing the remainder of the components to be non-interactive. Some embodiments may cause one or more components or subcomponents to be non-interactive by generating a semi-modal pane (either transparent or non-transparent) that can be overlaid on top of those to-be-non-interactive components. As such, interactivity of those components and subcomponents by a user can be prevented.

In some embodiments, semi-modal controller 110 may send interactivity information to interactivity engine 112 or to client device 104 directly where the interactivity information can define the components that should remain interactive and the components that should be blocked.

In certain embodiments, visual analyzer module 120 can receive the interactivity information and generate a set of overlays (e.g., transparent overlays/blocks) to be displayed across portions of the layout container to block out interactivity with components underneath. In some embodiments, renderer 122 may render a semi-modal glass pane around the active elements that would block the remaining parts of the page.

In some embodiments, interactivity engine 112 can cause one or more components or subcomponents to become non-interactive by generating one or more semi-modal panes overlaying those components or subcomponents. In certain embodiments, interactivity engine 112 may generate a set of overlays, blocks or panes for regions on the GUI such that interactivity with certain components on the user interface may be blocked out. In certain embodiments, to generate the semi-modal panes, interactivity engine 112 can determine the GUI coordinates for the one or more components or subcomponents. Different embodiments may block interactivity to the components differently.

Interactivity engine 112 may then send the semi-modal pane information to renderer 122 to display those overlays in some embodiments. In certain embodiments, interactivity engine 112 can send the semi-modal pane coordinates to the renderer (either rendering engine that is part of visual analyzer system 102 or renderer 122) for rendering the GUI. Renderer then draws the GUI based on the information received from interactivity engine 112. In some embodiments, interactivity engine 112 can send information about the "active" elements (i.e., elements to remain interactive) such as the component or subcomponent identifiers to the renderer for the renderer to generate block overlays for masking areas unoccupied by the "active" elements.

Figure 2:
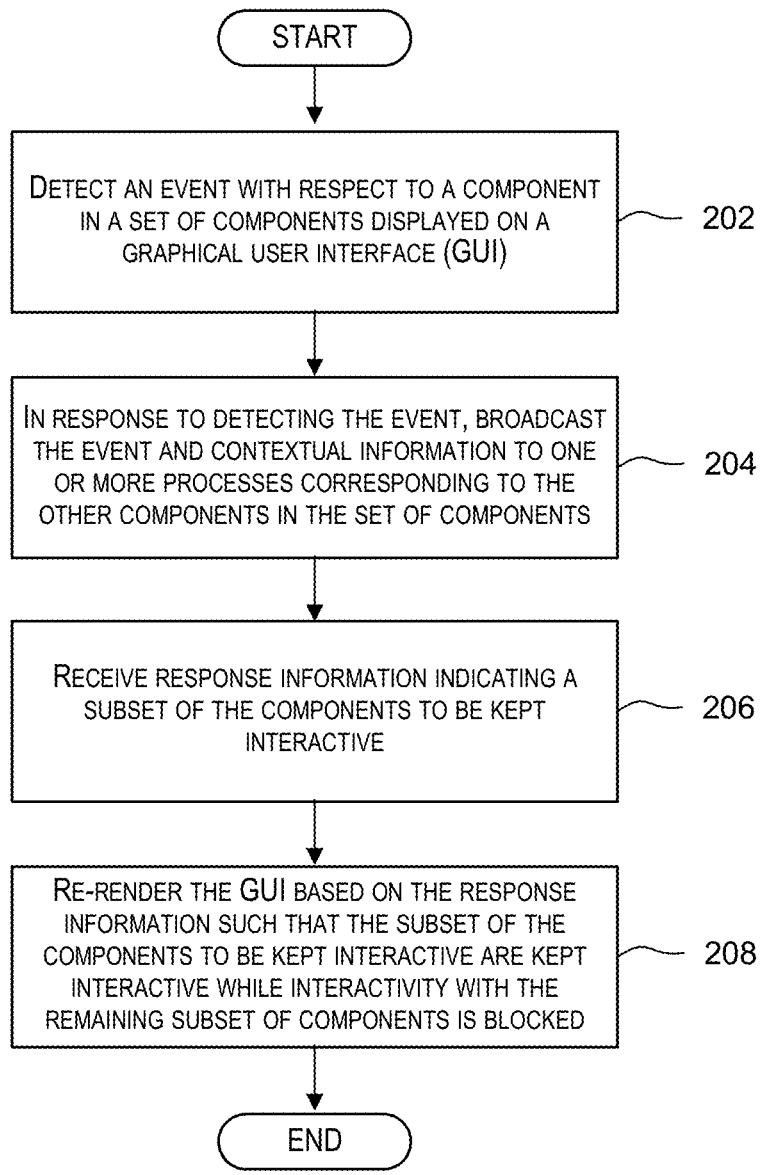
FIG. 2 illustrates an example process of determining one or more components (and/or subcomponents) displayed in a GUI of an application to keep interactive in accordance with some embodiments of the present invention.

II. Example Flow for Blocking Interaction with a Subset of Components in a Visual Analyzer Application Some embodiments create a semi-modal pane to allow interactions in certain areas of the application while preventing interaction outside of these certain areas. FIG. 2 illustrates an example process 200 of determining one or more components (and/or subcomponents) displayed in a GUI of an application to keep interactive in accordance with some embodiments of the present invention. In some embodiments, the visual analyzer application may utilize a contribution mechanism to determine a set of visible components (also referred to as elements throughout this disclosure) that may be made non-interactive and generate one or more overlays to prevent interactivity with those visible components.

At block 202, process 200 can detect an event with respect to a component in a set of components displayed on a GUI. A visual analyzer application can present a number of components and subcomponents on the GUI. In certain embodiments, the event can include a selection of a particular visual component or a subcomponent displayed on the GUI. Examples of a visual component can include a visualization, a menu bar, a window pane, etc. Each component can include one or more subcomponents such as a selectable button inside the visualization, a selectable data point in the visualization, a selectable option under a menu bar, a selectable element under a window pane, a dialog box, a properties pane, etc. representing different data sources or business objects (e.g., calendar data, product data, product type, office, etc.). The user may select a particular component or a subcomponent from the set of components being displayed through the GUI to specify a desire to interact with the particular component or subcomponent. In some embodiments, the selection of the subcomponent may be a command such as a request to open a properties dialogue box or a request to modify the subcomponent such as a data point in a visualization.

In some embodiments, the event can identify the source of the event and contextual information for the event. In certain embodiments, the source of the event includes an identifier of the component (also referred to as source component or originating component) or the subcomponent (also referred to as source subcomponent or originating subcomponent) with which the user has interacted to trigger the event. The contextual information for the event can include the information pertaining to the component or subcomponent or information pertaining to the processes corresponding to the component or subcomponent with which the user has interacted during the event. For instance, the contextual information for the event can include whether the interaction with the component or subcomponent was a selection of the component or subcomponent or whether the interaction was a modification to the component or subcomponent.

At block 204, process 200 can broadcast the event and contextual information to all other components in the set of components in response to the event. In some embodiments, the event and contextual information can be broadcasted to processes or threads corresponding to the various other components aside from the source component. For instance, a visual component can send out a message to all other components to inquire whether the other components and/or their subcomponents would like to be non-blocked or remain interactive during the event (e.g., while the user interacts with the source component, upon expiry of a timer, until the user triggers another event).

The broadcasted event can include identifying information associated with the source component. In some embodiments, contextual information associated with the source component such as the action directed to the source component may be included and broadcasted to the various other components presented by the application. The information broadcasted to the various components can be bundled in a payload and sent to the various components or processes corresponding to those components.

At block 206, process 200 can receive response information indicating which of the displayed components and/or subcomponents are to be non-blocked or kept interactive during the event. In some embodiments, the response information can instead indicate which components and/or subcomponents are to be blocked or non-interactive. In certain embodiments, the response information can be received from the various components indicating whether to not block the entire component or subcomponents within a component. This contribution mechanism allows active components that would like to remain interactive to register active HTML elements in some embodiments.

In certain embodiments, the response information can include one or more arrays. The response information can include an array for each component received from each of the components to which a broadcast message was sent. The array can include information (e.g., a set of binary digits) indicating whether the entire component is to be blocked or not-blocked, or whether subcomponents are to be blocked or non-blocked. Different embodiments may have different formats for conveying the response information. For instance, some embodiments may simply send back a message indicating all the components and/or subcomponents to be blocked or unblocked.

In some embodiments, each component may determine, based on a set of rules, whether it would like to remain interactive. The set of rules may specify for the component to remain interactive for certain components and/or for certain actions directed to certain components. Different embodiments may determine which components would like to remain interactive differently. In some embodiments, the determination as to whether a component would like to remain interactive can be based on at least one of the originating component (i.e., the particular component that is currently selected or active), the context surrounding the component (e.g., the component's functionality), and/or the action directed to the originating component (e.g., selection of a command to show a dialog box such as a properties dialog).

At block 208, process 200 can re-render the GUI based on the response information so that the components that have identified that they want to be interactive are kept interactive and that interaction with the other components is blocked. Some embodiments generate a set of overlays to be rendered over the components whose interactivity is to be blocked. The overlays can be in the shape of rectangular blocks in some embodiments.

If the response information indicates the subset of components and/or subcomponents to be kept interactive, the non-interactive components are those components in the set of components excluding the source component and the subset of components and/or subcomponents. Some embodiments can determine the regions within the layout container (where all the components are distributed and displayed in the GUI) that are displaying the non-interactive components. Upon determining those regions or subsections, the visual analyzer application can generate a set of overlay windows to cover those regions. By displaying the set of overlay windows over those regions including the non-interactive components, a user can be effectively blocked from interacting with those components lying under the overlay windows while interactivity with another set of visible elements is maintained. Different embodiments may effectively block interactivity with the non-interactive elements differently. For instance, some embodiments may re-render those non-interactive elements to be transparent such that they no longer appear to be visible to the user.

III. Example Screenshot of Utilizing One or More Semi-Modal Panes

Figure 3:
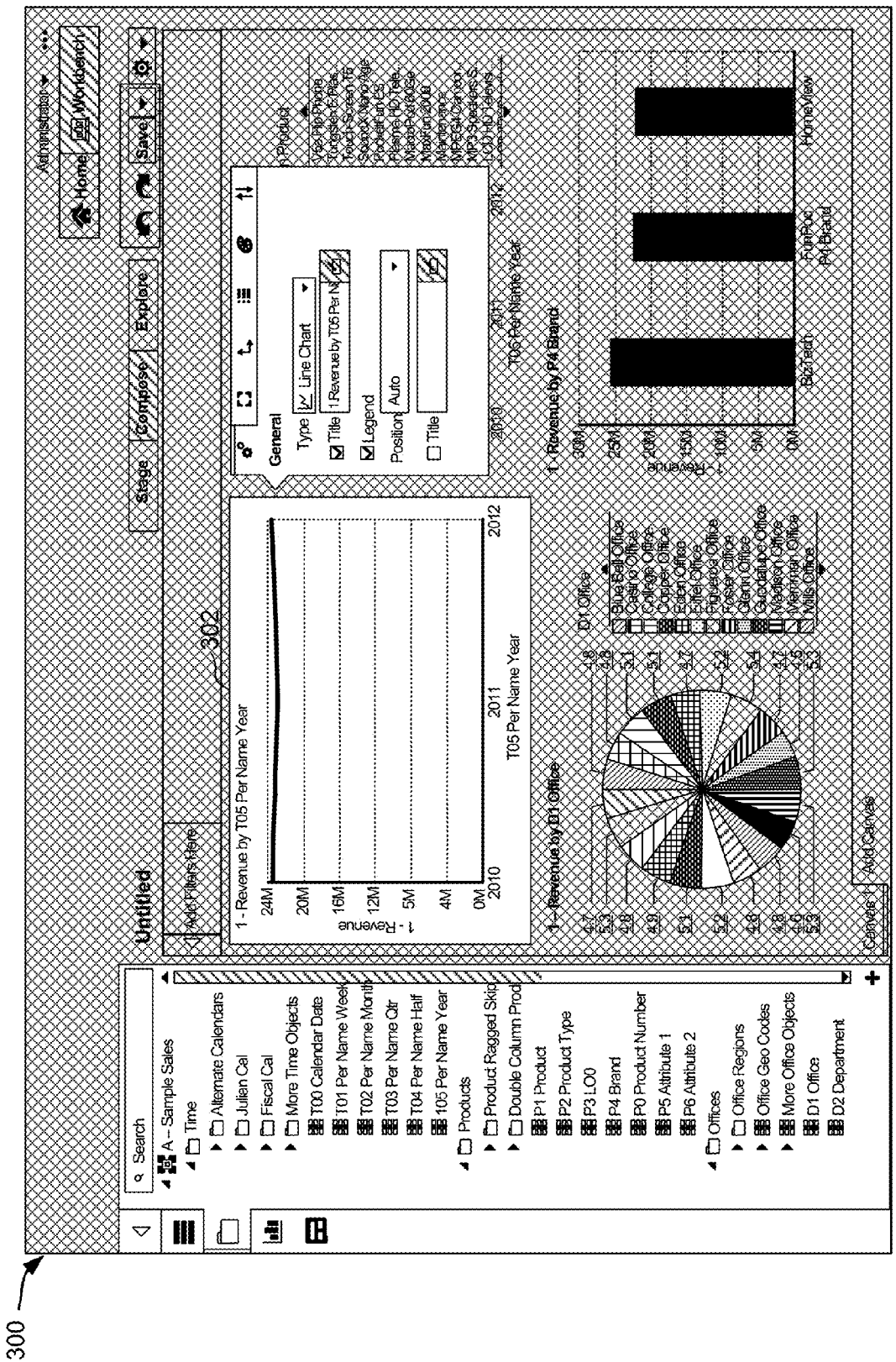
FIG. 3 illustrates an example of utilizing one or more semi-modal pane(s) as a semi-modal interaction blocker in accordance with some embodiments of the present invention.

FIG. 3 illustrates an example of utilizing one or more semi-modal pane(s) as a semi-modal interaction blocker in accordance with some embodiments of the present invention. A window 300 (also referred to as GUI 300) is displayed where one or more semi-modal pane(s) have been created to block user interaction with certain components and subcomponents of the application. The areas that have not been blocked include components in the visual analyzer application with which the user is allowed to interact.

In this example, areas in light gray indicate that the interaction with the components in those areas is blocked. A semi-modal pane generator (such as interactivity engine 112 in FIG. 1) can build a semi-modal overlay around the interactive components and prevent interaction with the remaining portions of the page (e.g., a Webpage, a layout container, the GUI of the application). The non-grayed areas include the components and subcomponents that are to remain interactive. In this example, the non-blocked areas include a visualization, a properties dialog, a panel that displays different data sources/columns/dimensions available to be selected and added to the visualization, and one or more command buttons (e.g., revert, save, etc.).

As described, in some embodiments, a contribution mechanism (also referred to as broadcast mechanism) can be utilized to determine dynamically the components and/or subcomponents that would like to remain interactive. Upon interaction with a particular component (e.g., selection of the visualization), the visual analyzer application (or in some instances the particular component) can send one or more broadcast signals to various other components (e.g., visible, active components not including the particular component) in this Webpage. The broadcast signal may identify the particular component (e.g., the selected visualization) and additional contextual information pertaining to the particular component. In this instance, the contextual information can include an indication that the interaction with the visualization is a selection of the visualization and dimensions/columns used to generate the visualization.

Some embodiments may receive response messages from the various components that received the broadcast message indicating to allow those components to be interactive and accessible to the user. Upon determining the components that would like to stay interactive, the application identifies the regions to block and generates a semi-modal pane or overlay to be displayed over those regions. In some embodiments, the overlay window(s) may be transparent. In certain embodiments, the overlay window(s) may be translucent or even opaque. In this example, the overlay window is a semi-translucent, dimmed window that signals to the user that those components covered by the window are inaccessible to or non-interactive with the user. Different embodiments may cause interaction with the components or subcomponents to be prevented differently. In some embodiments, components and/or subcomponents made to be non-interactive may return to being non-blocked when the event has concluded. The overlay windows can be removed to allow a user to interact with these components again.

In some embodiments, the response message from one or more components may indicate to block or to keep interactive a portion of the component (i.e., subcomponents). While some embodiments determine what to block or unblock on a component-by-component basis, some embodiments may allow components to indicate to block (or to keep interactive) only a portion of the component that is less than the full component. For example, a tool bar component may indicate to unblock only an undo button while blocking off the rest of the subcomponents on the tool bar. In another example, the properties panel may signal (e.g., via an array) to mask certain selectable elements while keeping the rest of the elements interactive. Each component can add HTML elements it wishes to remain capable of interacting with a user for the event to an "activeElements" array where the array includes an "activeElements" parameter that can indicate which subcomponents to keep interactive. Some embodiments may not distinguish between components and subcomponents: each visible elements (e.g., each button in a tool bar, each selectable element in a visualization) may receive a broadcast message and return response information regarding the element.

In this example, the event is a selection of a particular visualization V1 302. The various other components on the GUI receives a broadcast message (e.g., from a semi-modal controller such as semi-modal controller 110 from FIG. 1) and sends back a response indicating whether each component (and their subcomponents) would like to remain interactive. In this example, the various components receiving the broadcast message can include other visualizations such as V2 304, V3 306, and V4 308. Additional components such as tool bar 310, a properties dialog box 312 caused to be displayed upon selection of V1 302, and data elements pane 314 may receive a broadcast message. In some embodiments a component such as data elements pane 314 may not receive a broadcast message is it may be a component designated to remain interactive-capable throughout the entire project session.

Upon receiving response information and determining which components and subcomponents to keep interactive with the user selection of V1 302, the visual analyzer application can generate (via an interactivity engine such as interactivity engine 112 from FIG. 1) one or more blocks or masks that can be overlaid across the GUI in areas outside of the areas occupied by the components and subcomponent to keep interactive. In this instance, in addition to particular visualization V1 302, properties dialog 312, data elements pane 314, and subcomponents 316-320 of tool bar component 310 have been identified as components and/or subcomponents to be kept interactive. The visual analyzer application can then determine the coordinates of the components and subcomponents that are to remain interactive and generate one or more blocks to cover the remainder of the GUI so as to prevent the user from interacting with the remainder components. As shown in this example, the areas in the GUI where interactivity has been blocked is grayed out.

In some embodiments, upon the occurrence of another event, (e.g., further interaction with a visualization, selection of a particular button on e.g., the properties dialogue, some action performed on an active element/component), a new broadcast message can be sent to various components. In certain embodiments, the new broadcast message can be sent to all the components displayed in the window. In some embodiments, the new broadcast message is sent to only those components that are currently unblocked. A response message indicating which components may be interactive can be received. The visual analyzer application may create additional overlay windows to block interactivity with those components that do not desire to remain interactive. In some embodiments, when the other event has ended (e.g., additional window or panel that the event caused to be displayed is closed), all the components that were made non-interactive or that were blocked because of the event (e.g., selection of the additional window or panel) may be made interactive again. Some embodiments remove the overlays blocking interactivity with the elements that were made non-interactive due to the event upon expiry of the event or a timer.

IV. Example Screenshots for Generating One or More Semi-Modal Panes

FIGS. 4A-4E illustrate an example of blocking interactivity with one or more components or subcomponents in a GUI 400 of a visual analyzer application in accordance with some embodiments. In some embodiments, the visual analyzer application can identify the components and/or subcomponents to keep interactive (also referred to as "active elements"). The visual analyzer application can generate one or more blocks to be overlaid over areas of the GUI not occupied by the components and/or subcomponents to be kept interactive.

Figures 4A, 4B:
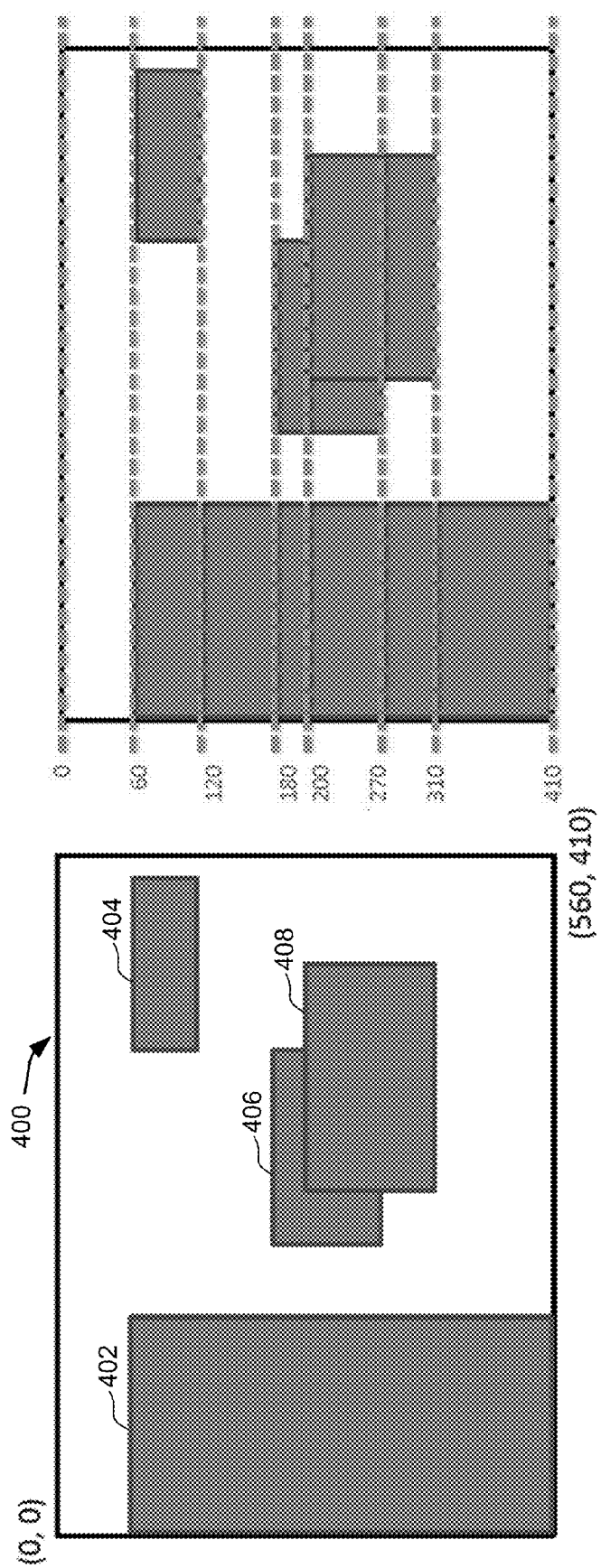

As shown in FIG. 4A, an interactivity engine (also referred to as block generator) such as interactivity engine 112 of FIG. 1 that is part of the visual analyzer application can calculate the dimensions of the layout container and the active elements. The interactivity engine's objective is to fill the area inside the layout container (e.g., browser window) without overlaying anything on top of the active elements. In this example, there are 4 active blocks, each with a set of coordinates to identify their locations within the layout container. For example, the active blocks here have coordinates: activeBlock1 402: [x1: 0, y1: 60, x2: 180, y2: 410], activeBlock2 404: [x1: 400, y1: 60, x2: 550, y2: 120], activeBlock3 406: [x1: 240, y1: 180, x2: 400, y2: 270], activeBlock4 408: [x1: 280, y1: 200, x2: 470, y2: 310].

In FIG. 4B, the interactivity engine may calculate the y-markers. In some embodiments, the interactivity engine may iterate over each block and add its y-coordinates (y1 and y2) to a set of y values. The interactivity engine may add the layout container's y1 and y2 coordinate values to the set of y value as well. After all the coordinates have been added to the set, the interactivity engine orders the set in one direction or another (e.g., min-to-max or max-to-min). In this example, the interactivity engine orders the set of y values from min-to-max. The area between each pair of y values defines a new row that must be filled in some embodiments. In this example, the yValues: [0, 60, 120, 180, 200, 270, 310, 410].

In FIG. 4C, the interactivity engine may fill in the rows by iterating over the set of y values. In some embodiments, the loop can look like for (var i=1; i<yValues.length; i++) where y1=yValues[i−1] and y2=yValues[i]. y1 and y2 can define the boundaries for a row in the semi-modal pane. In the first iteration, y1=0, and y2=60.

In FIG. 4D, the interactivity engine may find the effected active elements. When rendering a row, the active elements that intersect the row need to be identified in order to build blocks around them. For each row, the interactivity engine calculates the mid-Y value and checks to see if it intersects any of the active elements. For example, y1=0, y2=60, then middy=y1+((y2−y1)/2)=30. There are no intersected blocks for this iteration.

Figure 4F:
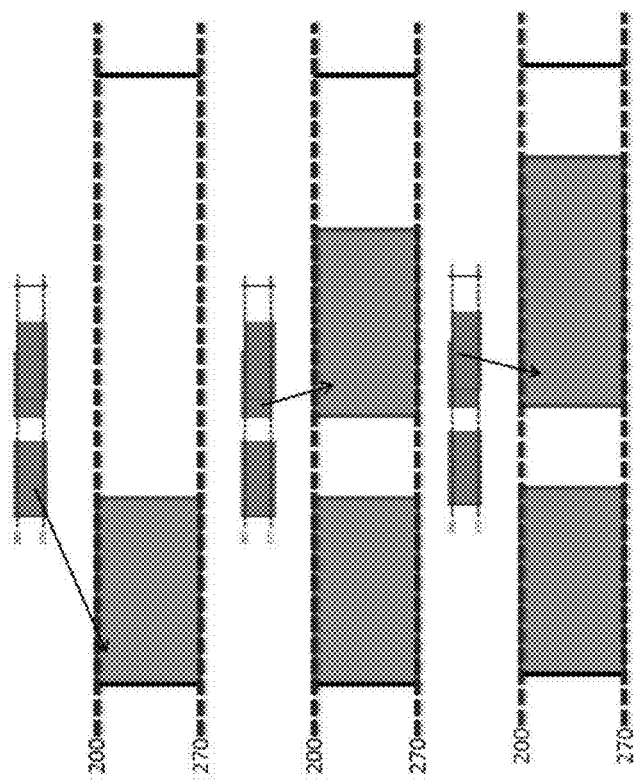
Figure 4E:
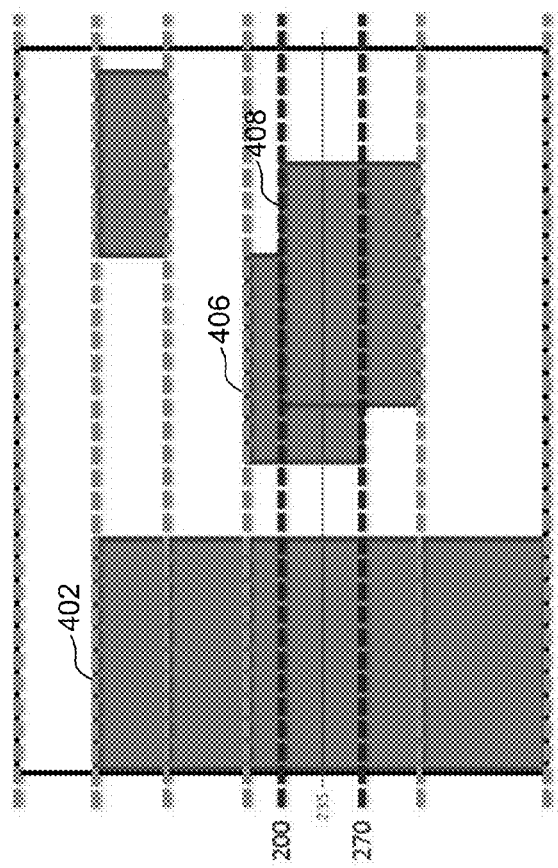

In FIG. 4E, the interactivity engine continue down the set of y values to determine any effected active elements. As shown in this example, when y1=200, y2=270, and midy=235, there are 3 intersected blocks: activeBlock1 402 [x1: 0, y1: 60, x2: 180, y2: 410], activeBlock3 406 [x1: 240, y1: 180, x2: 400, y2: 270], and activeBlock4 408 [x1: 280, y1: 200, x2: 470, y2: 310].

In some embodiments, the interactivity engine can determine whether there are overlapping interactive elements in a row and smooth the overlapping interactive elements. Some embodiments may iterate over the intersected blocks in the row and generate a set of new blocks for that row. If an overlap is detected (such as that shown by activeBlock3 406 and activeBlock4 408 in Fig. E), some embodiments may merge the two blocks into a single block, such that that shown in FIG. 4F. In this example, step 0: activePanes=[ ]; step 1: activePanes=[x1: 0, y1: 200, x2: 180, y2: 270]; step 2: activePanes=[[x1: 0, y1: 200, x2: 180, y2: 270], [x1: 240, y1: 200, x2: 400, y2: 270]]; step 3: activePanes=[[x1: 0, y1: 200, x2: 180, y2: 270], [x1: 240, y1: 200, x2: 470, y2: 270]]. In step 3, blocks 2 and 3 have been merged into a single block.

Subsequently, the active elements can be sorted. Once the condensed list of active blocks that intersect a row is generated, the interactivity engine sorts the blocks from left to right (e.g., using min-to-max x1 value). An example of sorted panes include: activePanes=[[x1: 0, y1: 200, x2: 180, y2: 270], [x1: 240, y1: 200, x2: 470, y2: 270]]

Figure 4H:
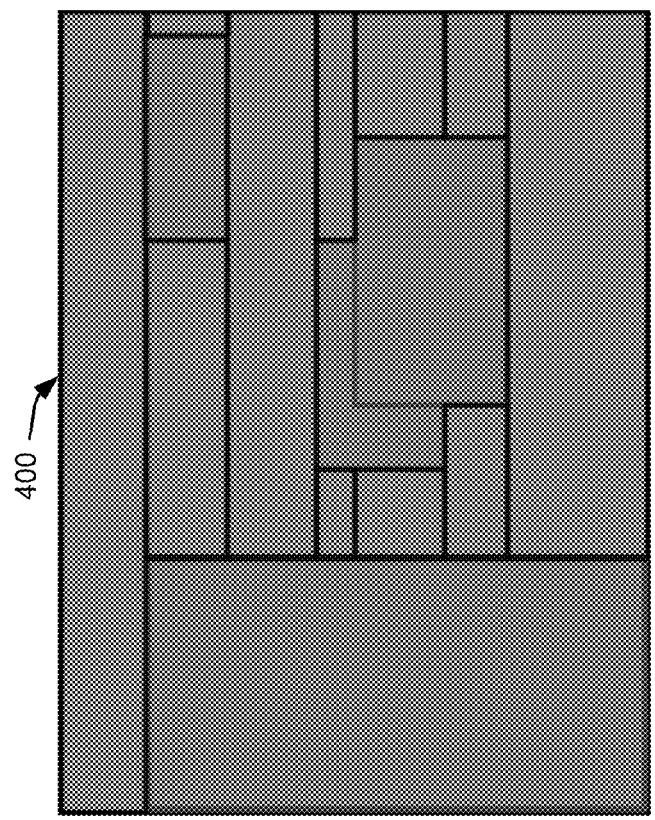
Figure 4G:
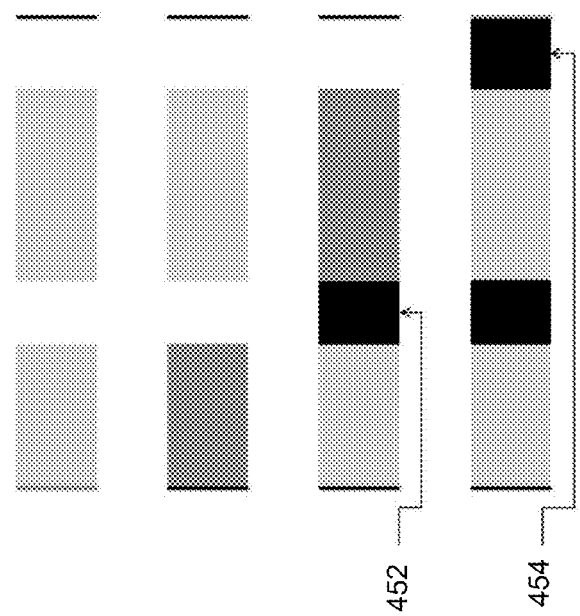

FIG. 4G illustrates that the blocker elements can be rendered by iterating over the active panes and stamping out the blocker elements left to right. In some embodiments, the blocker elements can be rendered by a renderer such as renderer 122 in FIG. 1 or another rendering engine. Some embodiments may iterate over the active panes and stamp out blocker elements from left to right. In this example, startX is initially 0, endX is the block's left edge (x1). Block: [x1: 0, y1: 200, y2: 180, y2: 270], startX: 0, endX: 0, add block: none. After active block is processed, startX is updated to active block's right edge (x2). Block: [x1: 240, y1: 200, x2: 470, y2: 270], startX: 180, endX: 240, add block: [x1: 180, y1: 200, x2: 240, y2: 270]. This block corresponds to block 452. At the end, embodiments can iterate one more time using container's right edge (x2) as final endX value. startX: 470, endX: 560, add block: [x1: 470, y1: 200, x2: 560, y2: 270]. This block corresponds to block 454.

Figure 5:
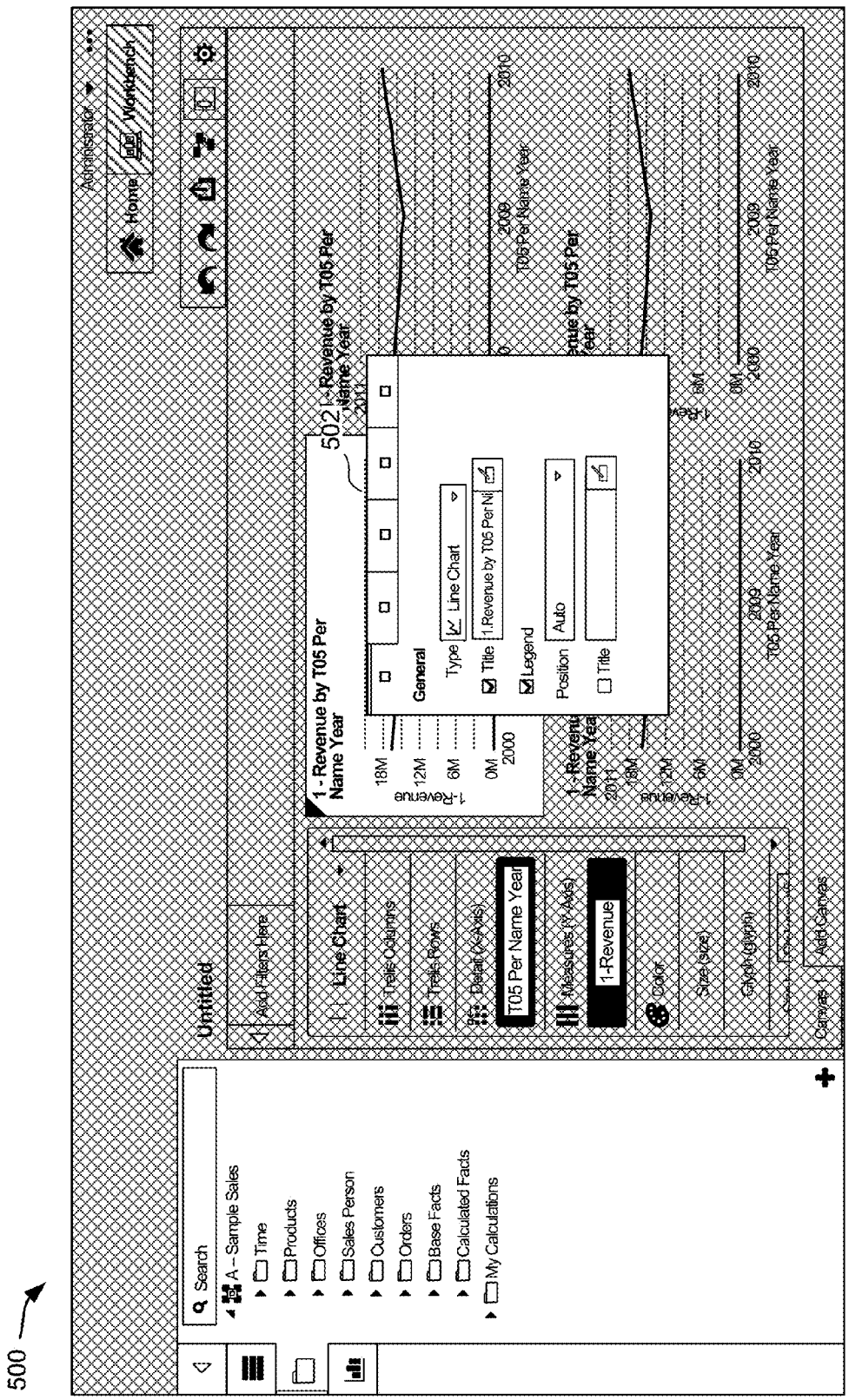
FIG. 5 illustrates an example of the non-interactive areas shown as being blocked by multiple semi-modal panes in visual analyzer application in accordance with some embodiments.

Upon iterating through all the rows, the interactivity engine can fill in all the non-interactive areas in GUI 400 with blocked elements, such as that shown in FIG. 4H. An example of the non-interactive areas shown as being blocked by multiple semi-modal panes in visual analyzer application can be shown in FIG. 5. Different embodiments may block out the non-interactive components and/or areas of the GUI differently. Further, in some embodiments, the blocked elements may be transparent such that the user may continue to see the elements displayed on the page although interaction with the elements is restricted. In some embodiments, the blocked elements may be translucent or opaque to convey to the user that interactivity with those areas is limited.

V. Example Distributed System

Figure 6:
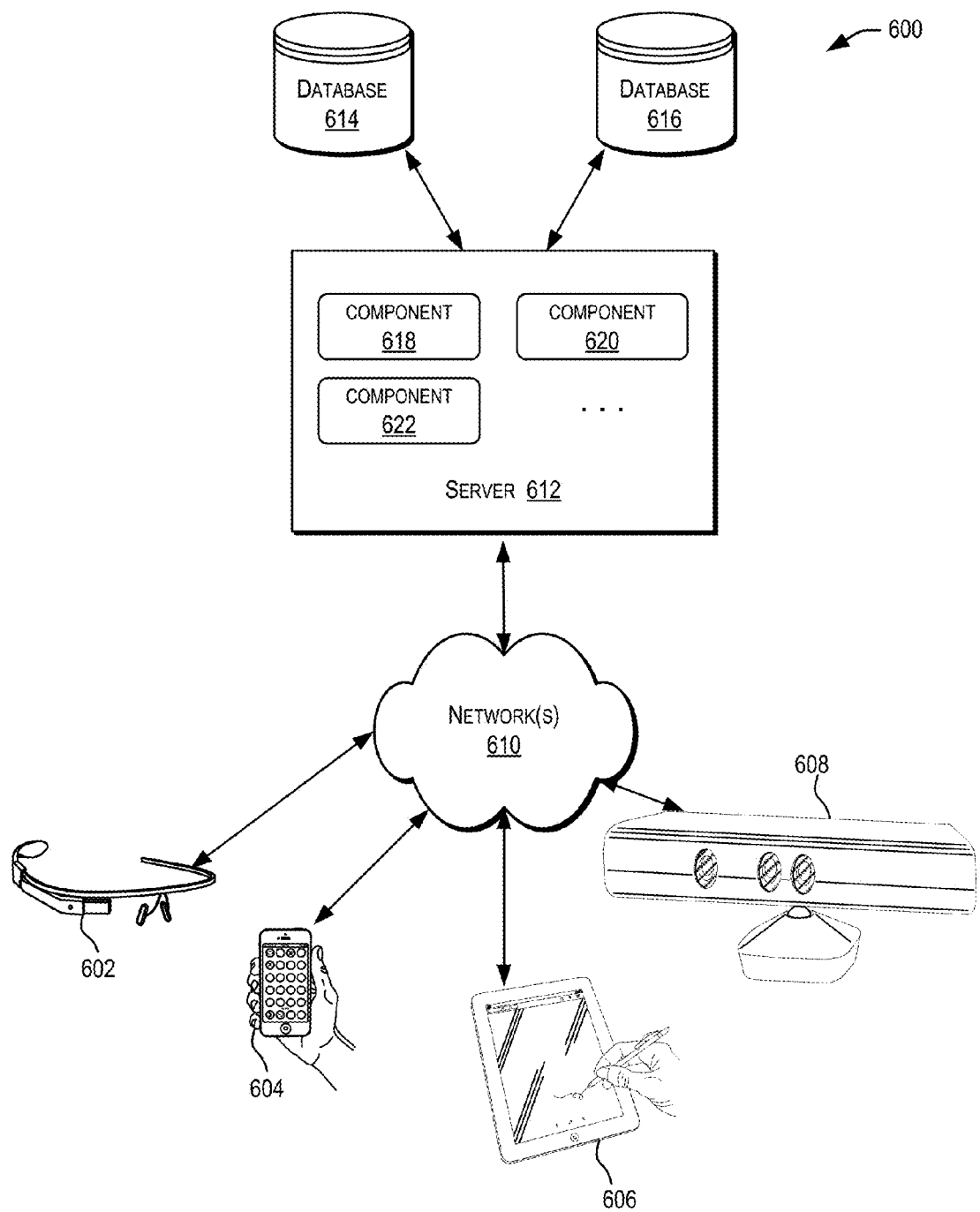
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications such as services and applications that provide the document (e.g., webpage) analysis and modification-related processing. In certain embodiments, server 612 may also provide other services or software applications that can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

V. Example System Environment

Figure 7:
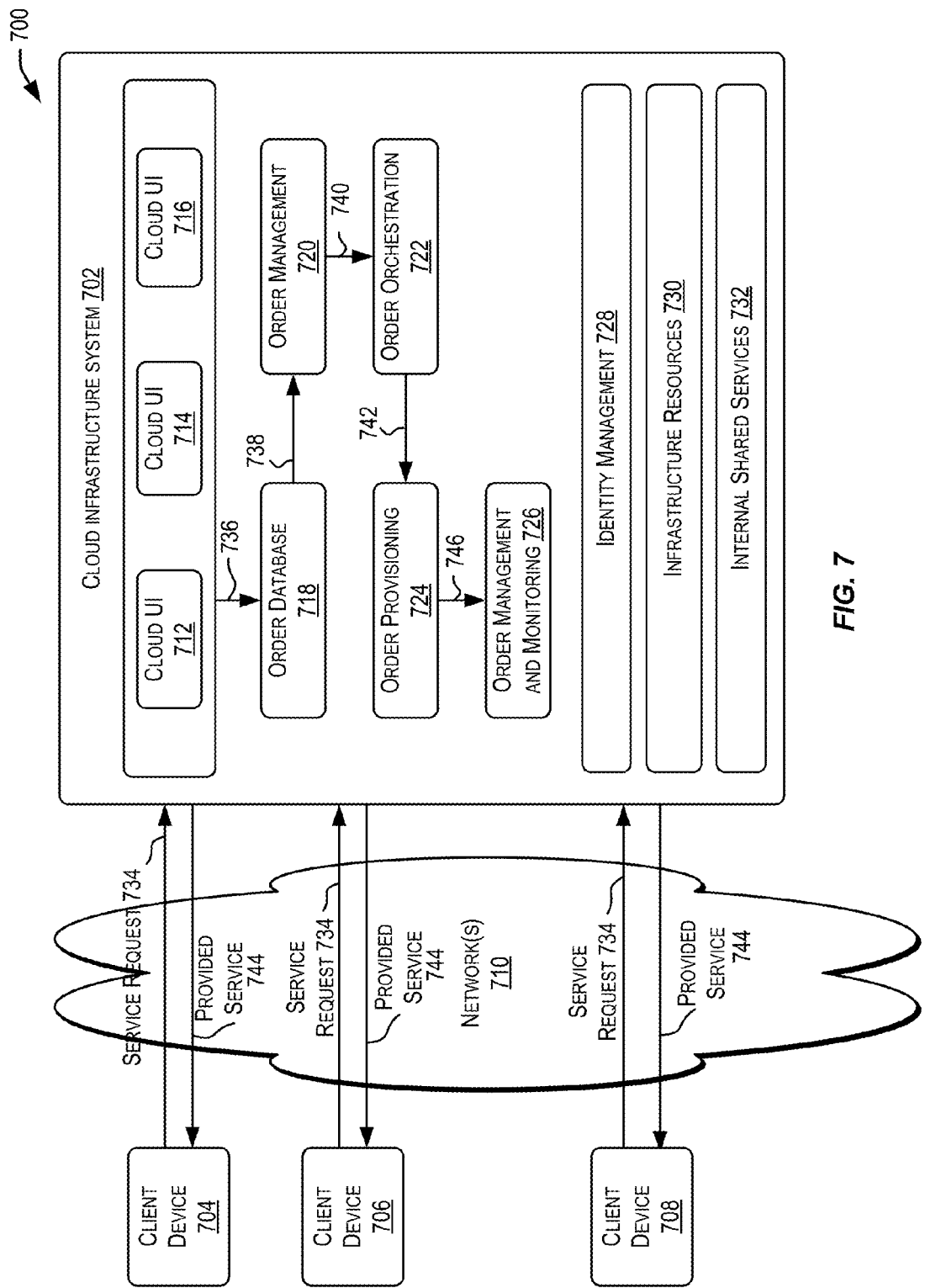
FIG. 7 is a simplified block diagram of one or more components of a system environment in which services may be offered as cloud services, in accordance with an embodiment of the present disclosure.

In some embodiments, the document analysis and modification services described above may be offered as services via a cloud environment. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for dynamically modifying documents (e.g., webpages) responsive to usage patterns. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services.

For example, statistics may be collected for the amount of storage used, the amount of data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

VI. Example Computer System

Figure 8:
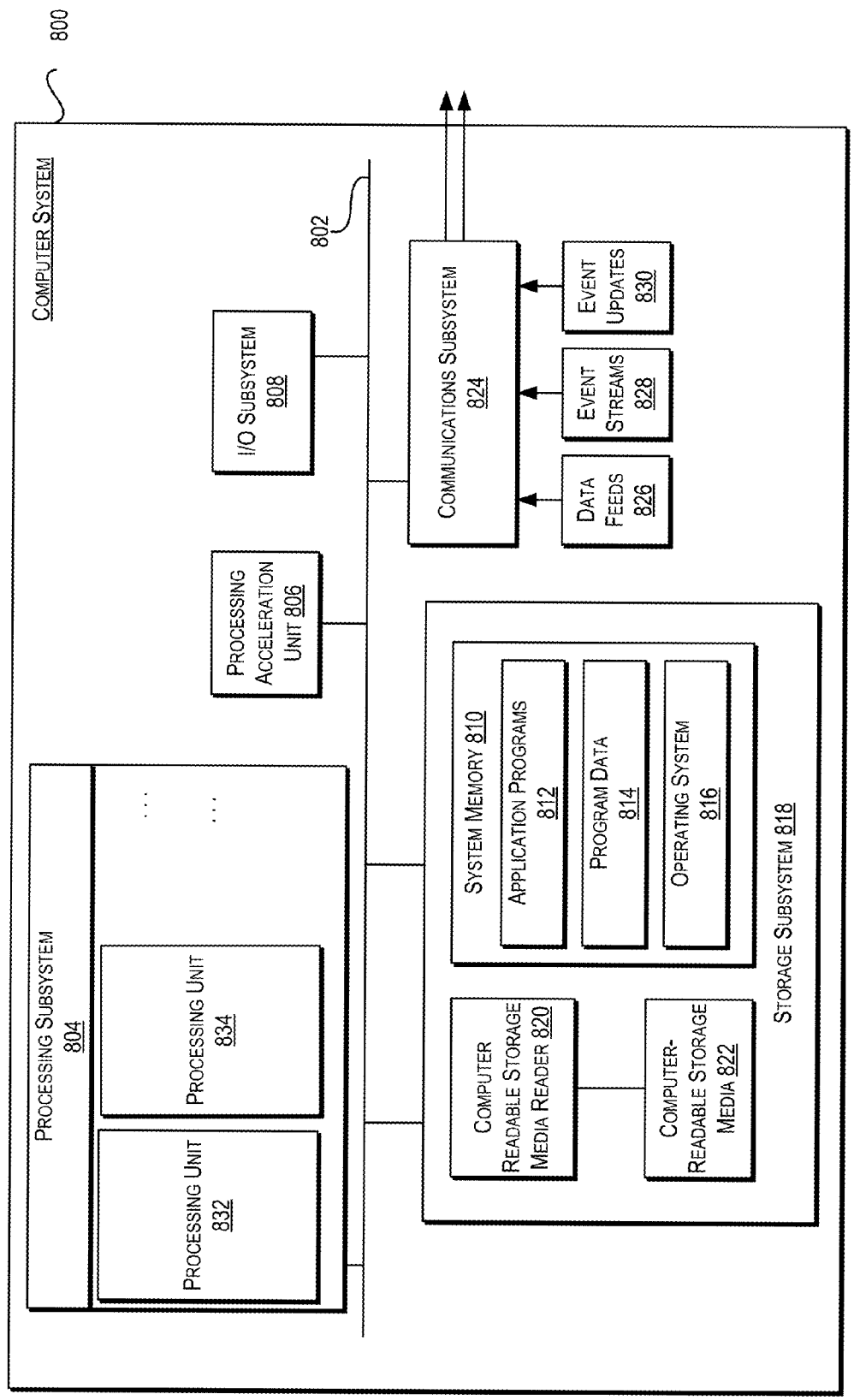
FIG. 8 illustrates an exemplary computer system that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for dynamically modifying documents (e.g., webpages) responsive to usage patterns.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, visual analyzer system 102 depicted in FIG. 1 may receive user interactions information and webpage requests from client devices using communication subsystem 824. Additionally, communication subsystem 824 may be used to communicate webpages from visual analyzer system 102 to the requesting clients.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    detecting, by one or more processors, an event with respect to an originating component in a set of components, wherein the set of components are displayed on a graphical user interface (GUI);
    in response to detecting the event, broadcasting a message comprising: (i) identifying information for the originating component and (ii) contextual information associated with the event that includes a user interaction with the originating component that triggered the event, to a first subset of the set of components fewer than all of the components in the set of components, one or more threads corresponding to the first subset of the set of components or one or more processes corresponding to the first subset of the set of components, wherein the first subset of the set of components does not include the originating component;
    receiving response information from the first subset of the set of components, the one or more threads, or the one or more processes that identifies a second subset of the components that are to be interactive for the event, wherein, in response to receiving the message, each of the components of the first subset of the set of components makes a determination as to whether the component will remain interactive or non-interactive for the event and responds with the determination as a part of the response information; and
    re-rendering the GUI based on the response information such that the second subset of the components to be kept interactive are kept interactive while interactivity for all components remaining in the first subset of the set of components is blocked.

2. The method of claim 1, wherein the event includes identifying the information associated with the originating component.

3. The method of claim 1, wherein detecting the event includes receiving a selection of the originating component in the set of components displayed on the GUI, the selection of the originating component causing another component to be displayed on the GUI, wherein the message is broadcasted to the other component caused to be displayed by the selection of the component.

4. The method of claim 1, wherein the response information is received from each of the first subset of the set of components, the one or more threads, or the one or more processes, the response information including an array corresponding to each component, thread, or process, wherein the response information indicates whether to keep each of the components or a portion of the component less than the full component interactive during the event.

5. The method of claim 1, wherein re-rendering the GUI includes enabling access to the second subset of the components during the event and blocking interactivity with all the components remaining in the first subset of the set of components.

6. The method of claim 5, wherein blocking interactivity with all the components remaining in the first subset of the set of components includes generating a set of overlays to be displayed over the remaining subset of components, and wherein the set of overlays are generated by determining a set of coordinates of the components remaining in the first subset of the set of components and building a collection of blocks around the coordinates of the components remaining in the first subset of the set of components.

7. The method of claim 5, wherein blocking interactivity with all the components remaining in the first subset of the set of components includes:
- determining one or more regions within a browser window that is occupied by the second subset of components;
- identifying, using the determined one or more regions, one or more areas within the browser window that is not occupied by the second subset of components;
- generating one or more panels to cover the identified one or more areas within the browser window that is not occupied by the second subset of components; and
- inserting the one or more panels in the identified one or more areas within the browser window to block interactivity with all the components remaining in the first subset of the set of components.

8. A system comprising:
one or more processors; and
memory coupled to the one or more processors, the memory encoded with a set of instructions configured to perform a process comprising:
- detecting, by the one or more processors, an event with respect to an originating component in a set of components, wherein the set of components are displayed on a graphical user interface (GUI);
- in response to detecting the event, broadcasting a message comprising: (i) identifying information for the originating component and (ii) contextual information associated with the event that includes a user interaction with the originating component that triggered the event, to a first subset of the set of components fewer than all of the components in the set of components, one or more threads corresponding to the first subset of the set of components or one or more processes corresponding to the first subset of the set of components, wherein the first subset of the set of components does not include the originating component;
- receiving response information from the first subset of the set of components, the one or more threads, or the one or more processes that identifies indicating to keep a second subset of the components that are to be interactive for the event, wherein, in response to receiving the message, each of the components of the first subset of the set of components makes a determination as to whether the component will remain interactive or non-interactive for the event and responds with the determination as a part of the response information; and
- re-rendering the GUI based on the response information such that the second subset of the components to be kept interactive are kept interactive while interactivity for all components remaining in the first subset of the set of components is blocked.

9. The system of claim 8, wherein the event includes identifying the information associated with the originating component.

10. The system of claim 8, wherein detecting the event includes receiving a selection of the originating component in the set of components displayed on the GUI, the selection of the originating component causing another component to be displayed on the GUI, wherein the message is broadcasted to the other component caused to be displayed by the selection of the component.

11. The system of claim 8, wherein the response information is received from each of the first subset of the set of components, the one or more threads, or the one or more processes, the response information including an array corresponding to each component, thread, or process, wherein the response information indicates whether to keep each of the components or a portion of the component less than the full component interactive during the event.

12. The system of claim 8, wherein re-rendering the GUI includes enabling access to the second subset of the components during the event and blocking interactivity with all the components remaining in the first subset of the set of components.

13. The system of claim 12, wherein blocking interactivity with all the components remaining in the first subset of the set of components includes generating a set of overlays to be displayed over the remaining subset of components, and wherein the set of overlays are generated by determining a set of coordinates of the components remaining in the first subset of the set of components and building a collection of blocks around the coordinates of the components remaining in the first subset of the set of components.

14. The system of claim 12, wherein blocking interactivity with all the components remaining in the first subset of the set of components includes:
- determining one or more regions within a browser window that is occupied by the second subset of components;
- identifying, using the determined one or more regions, one or more areas within the browser window that is not occupied by the second subset of components;
- generating one or more panels to cover the identified one or more areas within the browser window that is not occupied by the second subset of components; and
- inserting the one or more panels in the identified one or more areas within the browser window to block interactivity with all the components remaining in the first subset of the set of components.

15. A non-transitory computer readable storage medium storing instructions that, when executed by one or more processors of a first computing device, cause the first computing device to perform operations comprising:
- detecting, by the one or more processors, an event with respect to an originating component in a set of components, wherein the set of components are displayed on a graphical user interface (GUI);
- in response to detecting the event, broadcasting a message comprising: (i) identifying information for the originating component and (ii) contextual information associated with the event that includes a user interaction with the originating component that triggered the event, to a first subset of the set of components fewer than all of the components in the set of components, one or more threads corresponding to the first subset of the set of components or one or more processes corresponding to the first subset of the set of components, wherein the first subset of the set of components does not include the originating component;
- receiving response information from the first subset of the set of components, the one or more threads, or the one or more processes that identifies a second subset of the components that are to be interactive for the event, wherein, in response to receiving the message, each of the components of the first subset of the set of components makes a determination as to whether the component will remain interactive or non-interactive for the event and responds with the determination as a part of the response information; and re-rendering the GUI based on the response information such that the second subset of the components to be kept interactive are kept interactive while interactivity for all components remaining in the first subset of the set of components is blocked.

16. The computer readable storage medium of claim 15, wherein detecting the event includes receiving a selection of the originating component in the set of components displayed on the GUI, the selection of the originating component causing another component to be displayed on the GUI, wherein the message is broadcasted to the other component caused to be displayed by the selection of the component.

17. The computer readable storage medium of claim 15, wherein the response information is received from each of the first subset of the set of components, the one or more threads, or the one or more processes, the response information including an array corresponding to each component, thread, or process, wherein the response information indicates whether to keep each of the components or a portion of the component less than the full component interactive during the event.

18. The computer readable storage medium of claim 15, wherein re-rendering the GUI includes enabling access to the second subset of the components during the event and blocking interactivity with all the components remaining in the first subset of the set of components.

19. The computer readable storage medium of claim 18, wherein blocking interactivity with the remaining subset of the components includes generating a set of overlays to be displayed over the remaining subset of components, and wherein the set of overlays are generated by determining a set of coordinates of the subset of the components and building a collection of blocks around the coordinates of the subset of the component.

20. The computer readable storage medium of claim 18, wherein blocking interactivity with all the components remaining in the first subset of the set of components includes:

determining one or more regions within a browser window that is occupied by the second subset of components;

identifying, using the determined one or more regions, one or more areas within the browser window that is not occupied by the second subset of components;

generating one or more panels to cover the identified one or more areas within the browser window that is not occupied by the second subset of components; and inserting the one or more panels in the identified one or more areas within the browser window to block interactivity with all the components remaining in the first subset of the set of components.

* * * * *

UNITED STATES PATENT AND TRADEMARK OFFICE
CERTIFICATE OF CORRECTION

PATENT NO. : 10,156,957 B2  
APPLICATION NO. : 14/866365  
DATED : December 18, 2018  
INVENTOR(S) : Dyar et al.

Page 1 of 1

It is certified that error appears in the above-identified patent and that said Letters Patent is hereby corrected as shown below:

In the Specification

In Column 5, Line 57, delete "(WAN),)," and insert -- (WAN), --, therefor.

In Column 6, Line 18, delete "and or" and insert -- and/or --, therefor.

In Column 15, Line 29, delete "that that" and insert -- that --, therefor.

In Column 15, Line 42, delete "270]]" and insert -- 270]]. --, therefor.

In the Claims

In Column 29, Line 49, in Claim 8, after "identifies" delete "indicating to keep".

Signed and Sealed this  
Fourteenth Day of January, 2020

Andrei Iancu  
*Director of the United States Patent and Trademark Office*